United States Patent
Godon

(10) Patent No.: US 7,714,074 B2
(45) Date of Patent: May 11, 2010

(54) POLYETHYLENE PIPE FITTING RESINS

(75) Inventor: Pascale Godon, Brussels (BE)

(73) Assignee: Ineos Manufacturing Belgium NV, Antwerpen (BE)

(*) Notice: Subject to any disclaimer, the term of this patent is extended or adjusted under 35 U.S.C. 154(b) by 391 days.

(21) Appl. No.: 11/628,866

(22) PCT Filed: May 27, 2005

(86) PCT No.: PCT/EP2005/005823

§ 371 (c)(1), (2), (4) Date: Aug. 13, 2007

(87) PCT Pub. No.: WO2005/121238

PCT Pub. Date: Dec. 22, 2005

(65) Prior Publication Data

US 2008/0033135 A1 Feb. 7, 2008

(51) Int. Cl.
*C08F 210/02* (2006.01)

(52) U.S. Cl. .......... 525/240; 526/351; 526/352
(58) Field of Classification Search ............ 525/240; 526/351, 352
See application file for complete search history.

(56) References Cited

FOREIGN PATENT DOCUMENTS

| EP | 1 359 191 A1 | * | 11/2003 |
| WO | WO 00/60001 | | 10/2000 |
| WO | WO 02/102891 A1 | | 12/2002 |

\* cited by examiner

*Primary Examiner*—Robert D. Harlan
(74) *Attorney, Agent, or Firm*—Nixon & Vanderhye

(57) ABSTRACT

Polyethylene resin suitable for formation into pipes or pipe fittings having an M15 of from 0.40 to 0.70 g/10 min, and including from 47 to 52 wt % of a low molecular weight polyethylene fraction, and from 48 to 53 wt % of a high molecular weight polyethylene fraction. The high molecular weight polyethylene fraction includes a copolymer of ethylene and 1-hexen or 1-octene, and the resin has a density after granulation and addition of additives of between 957 kg/m$^3$ and 963 kg/m$^3$.

15 Claims, No Drawings

POLYETHYLENE PIPE FITTING RESINS

This application is the U.S. National Phase of International Application PCT/EP2005/005823, filed 27 May 2005, which designated the U.S. PCT/EP2005/005823 claims priority to European Application No. 04253420.6 filed 9 Jun. 2004. The entire content of these applications are incorporated herein by reference.

The present invention relates to polyethylene resins, more particularly those suitable for use as pipes, pipe attachments or fittings, and to a process for producing such resins. The present invention also relates to the use of polyethylene compounds comprising such resins for the manufacture of pipes or pipe fittings, and to such fittings themselves.

Polyolefins such as polyethylenes which have high molecular weight generally have improved mechanical properties over their lower molecular weight counterparts. However, high molecular weight polyolefins can be difficult to process and can be costly to produce.

For many HDPE applications, polyethylene with enhanced toughness, strength and environmental stress cracking resistance (ESCR) is important. These enhanced properties are more readily attainable with high molecular weight polyethylene. However, as the molecular weight of the polymer increases, the processibility of the resin decreases. By providing a polymer with a broad or bimodal molecular weight distribution (MWD), the desired properties that are characteristic of high molecular weight resins are retained while processability, particularly extrudability, is improved.

Polyethylene resins are known for the production of pipes and fittings. Pipe resins require high stiffness (creep rupture strength), combined with a high resistance against slow crack growth as well as resistance to crack propagation yielding impact toughness. However, there is the need to improve the creep rupture strength of currently available pipe resins, keeping the resistance against slow crack growth and the rapid crack propagation at least at a constant level. This would permit an increase in the pressure rating of such pipes.

Polyethylene pipes are widely used as they are lightweight and can be easily assembled by fusion welding. Polyethylene pipes also have a good flexibility and impact resistance, and are corrosion free. Unless polyethylene pipes are reinforced, they are however limited in their hydrostatic resistance by the inherent low yield strength of polyethylene. It is generally accepted that the higher the density of the polyethylene, the higher will be the long term hydrostatic strength. Pipe resins are known in the art which are referred to by the names "PE 80" and "PE 100". This classification is described in ISO 9080 and ISO 12162. These are polyethylene resins which when used for the formation of pipes of specific dimensions, survive a long term pressure test at different temperatures for a period of 5,000 hours. Extrapolation according to ISO 9080 shows that they have an extrapolated 20° C./50 years stress at a lower prediction level (97.5% confidence level—"LPL") of at least 8 and 10 MPa; such resins are known as PE80 and PE 100 resins respectively. The density of the current basic powder used in the production of a PE100 compound is close to 0.950 g/cm$^3$ (typically from 0.949 to 0.951 g/cm$^3$). Such polyethylene resins containing conventional amounts of black pigments have densities from about 0.958 to 0.960 g/cm$^3$. Pipe fittings are also required to have such properties. In addition, it is desired that pipe fittings have good resistance to sagging.

It is known in the art that the key components for a good PE 100 resin are the combination of a low molecular weight high density polyethylene with little or no short chain branching (SCB) due to comonomer incorporation and a linear low density polyethylene (LLDPE) resin with high molecular weight and SCB.

Usually, polyethylene resins of such composition are produced in a cascade reactor process using Ziegler-Natta catalysts. Another variant might be to blend different polyethylene powders and extrude them to form a physical blend, as opposed to a chemical blend produced using a cascade reactor. However, physical blending often leads to a poor mixing of the melts, which leaves large high molecular weight microscopic particles (referred to as gels in the art) embedded in the final product. The weight fraction of the LLDPE resin is around 50% of the blend. The low molecular weight high density polyethylene (HDPE) confers a high crystallinity, and thus a high rigidity and resistance to creep for the blend, and depresses the melt viscosity of the blend. The high molecular weight LLDPE provides the polyethylene blend with a high density of tie-molecules as a result of the short chain branching, which are responsible for the enhanced environmental stress crack growth resistance (ESCR) observed in these blends.

WO 00/60001 discloses a high density multimodal polyethylene for use in pipes and having a PE 80 and PE 100 rating, wherein the high molecular weight fraction typically comprises 45-55 wt % of the composition, and has a density less than 0.930 g/cm$^3$ and an HLMI of less than 0.30 g/10 min. The MI$_5$ of the resin is typically 0.2-0.3 g/10 min.

WO 02/34829 discloses a high density multimodal polyethylene for use in pipes or fittings, wherein the resin typically has an MI$_5$ of 0.2-0.6 g/10 min, and the low molecular weight fraction (LMW block) comprises at least 51 wt % of the resin. In Example 1 for example, the LMW block comprises 55 wt % of the resin, and the resin has an MI$_5$ of 0.63 g/10 min. This resin would not be suitable for pipe fittings because the very narrow molecular weight distribution (MWD) of the individual blocks and the narrow MWD of the resulting composition would cause both poor homogeneity and poor processability.

WO 02/102891 discloses a high density multimodal polyethylene for use in pipes or fittings, wherein the resin typically has an MI$_5$ of 0.15-2 g/10 min, and the low molecular weight fraction comprises at least 53 wt % of the resin. In Example 10 for example, the LMW block comprises 58.4 wt % of the resin, and the resin has an MI$_5$ of 0.54 g/10 min. This resin would not be suitable for pipe fittings because the very high proportion of first block would cause poor product homogeneity resulting in poor mechanical properties.

JP 2000-109521A discloses a high density multimodal polyethylene for use in pipes or fittings, wherein the resin typically has an MI$_5$ of 0.25-0.50 g/10 min, and the low molecular weight fraction comprises 45-60 wt % of the resin. There is no specific disclosure of the use of 1-hexene or 1-octene as comonomer in the high molecular weight fraction. The single Examples of the invention has an MI$_5$ of 0.42 g/10 min, but uses 1-butene as the comonomer and hence has a density of only 952 kg/m$^3$.

We have found that by selecting a particular combination of properties it is possible to obtain resins with the hydrostatic properties required for pipes, which makes them particularly suitable for pipe fittings as well as pipes.

Accordingly, the present invention provides in a first aspect a polyethylene resin having an MI$_5$ of from 0.40 to 0.70 g/10 min, and comprising from 47 to 52 wt % of a low molecular weight polyethylene fraction, and from 48 to 53 wt % of a high molecular weight polyethylene fraction, wherein the high molecular weight polyethylene fraction comprises a copolymer of ethylene and either 1-hexene or 1-octene.

We have found that the above choice of molecular weight, density and $MI_5$ can lead to a marked improvement of the processing behaviour of fittings injections, compared with other equivalent PE100 grades, whilst maintaining or even improving mechanical properties, such as stress crack resistance. In particular, injection-moulded pipe fittings made using the resin of the invention show excellent resistance to relaxation after injection. Such a balance of properties is not possible with a resin containing 1-butene as comonomer.

Preferably the low molecular weight polyethylene fraction comprises a polyethylene having a density of at least 0.965 g/cm$^3$ and an $MI_2$ of from 5 to 1000 g/10 min, and the high molecular weight polyethylene fraction has a density of from 0.910 to 0.940 g/cm$^3$ and an $MI_5$ of from 0.01 to 2 g/10 min.

The present invention further provides the use of such a polyethylene resin for the manufacture of pipes and fittings, and in a further aspect a pipe or fitting comprising the polyethylene resin of the invention.

Preferably the high molecular weight fraction comprises from 0.1-10 wt % of comonomer (ie 1-hexene or 1-octene).

Preferably the $MI_5$ of the resin is from 0.45 to 0.65 g/10 min. This value refers to the resin after granulation, not immediately upon exiting the polymerisation reactor. For the purposes of the present invention, $MI_2$ and $MI_5$ represent the fluidity indices measured according to ASTM standard D 1238 (1986) at a temperature of 190° C. under a load of 2.16 kg and 5 kg respectively. Fluidity index HLMI or $MI_{21}$ means the fluidity index measured according to ASTM standard D 1238 (1986) at a temperature of 190° C. under a load of 21.6 kg.

The resin of the present invention preferably comprises from 48 to 51% by weight of the low molecular weight fraction, more preferably between 49 and 51 wt %.

The resins according to the invention preferably have a density after granulation, (not immediately upon exiting the polymerisation reactor) measured according to ASTM standard D 792 (on a sample prepared according to ASTM standard D 1928 Procedure C) of at least 957 kg/m$^3$, more particularly at least 959 kg/m$^3$. Preferably the density does not exceed 963 kg/m$^3$. Particularly preferred are resins whose density is between 959 and 961 kg/m$^3$. These densities correspond to densities of "natural" resins, that is resins upon exiting the reactor before the addition of any additives such as pigments, of at least 948 kg/m$^3$, more particularly at least 950 kg/m$^3$, preferably not greater than 954 kg/m$^3$, and particularly between 950 and 952 kg/m$^3$.

The density of the polymer (A) present in the resins according to the invention is preferably at least 972 kg/m$^3$. The density of copolymer (B) is preferably at least 910 kg/m$^3$. The density of copolymer (B) does not exceed preferably 928 kg/m$^3$; more particularly not 926 kg/m$^3$.

For the purposes of the present invention, ethylene polymer (A) is an ethylene polymer comprising monomer units derived from ethylene and possibly monomer units derived from other olefins. Copolymer (B) is a copolymer comprising monomer units derived from ethylene and monomer units derived from 1-hexene or 1-octene.

For the purposes of the present invention, hexene or octene content is measured by RMN$^{13}$C according to the method described in J. C. RANDALL, JMS—REV. MACROMOL. CHEM. PHYS., C29(2&3), p. 201-317 (1989). For example the content of units derived from the comonomer is calculated from measurements of the integrals of the characteristic spectral lines of the comonomer (eg for hexene 23.4; 34.9 and 38.1 ppm) with respect to the integral of the characteristic spectral line of the units derived from ethylene (30 ppm).

The content in copolymer (B) of monomer units derived from 1-hexene or 1-octene, hereinafter called comonomer content, is generally at least 0.4 mole %, in particular at least 0.6 mole %. The comonomer content of copolymer (B) is usually at most 1.8 mole %, preferably at most 1.5 mole %. Particularly preferred is a comonomer content that does between 0.7 and 1.1 mole %.

Ethylene polymer (A) may optionally contain monomer units derived from another olefin. Ethylene polymer (A) comprises preferably at least 99.5 mole %, more particularly at least 99.8, mole % of monomer units derived from ethylene. Particularly preferred is an ethylene homopolymer.

Polymer (A) according to the invention preferably has an $MI_2$ of at least 200, preferably at least 250 g/10 min. The $MI_2$ of polymer (A) generally does not exceed 1000 g/10 min, preferably no more than 700 g/10 min. Polymer (A) preferably has an HLMI of at least 1000 g/10 min.

Polymer (A) preferably has an inherent viscosity $\eta_A$ (measured in tetrahydronaphthalene at 160° C., at a concentration of 1 g/l, by means of an Ostwald type viscosimeter (K2/K1 approximately 620)) of at least 0.45 dl/g, preferably at least 0.50 dl/g. Its inherent viscosity generally does not exceed 0.75 dl/g, and is preferably no higher than 0.65 dl/g.

The melt index $MI_5$ of copolymer (B) according to the invention is preferably at least 0.005 g/10 min. It preferably does not exceed 0.1 g/10 min. Copolymer (B) presents advantageously an HLMI of at least 0.05 g/10 min which also does not exceed 2 g/10 min.

Copolymer (B) has in general an inherent viscosity $\eta_B$ of at least 2.7 dl/g, preferably at least 3.9 dl/g. Its inherent viscosity $\eta_B$ does not exceed in general 10.9 dl/g, preferably not 7.6 dl/g.

In the resins according to the invention, the ratio between the inherent viscosity of copolymer (B) ($\eta_B$) and that of polymer (A) ($\eta_A$) is generally at least 4, preferably at least 6. The $\eta_B/\eta_A$ ratio does not generally exceed 15, preferably not 12.

The resin according to the invention typically has an $HLMI/MI_5$ ratio greater than 20, preferably greater than 25. The $HLMI/MI_5$ ratio does not usually exceed 150. Preferably, the $HLMI/MI_5$ ratio does not exceed 70. The $HLMI/MI_5$ ratio of the resin illustrates the broad or bimodal molecular weight distribution of the resin.

Polymer (A) and copolymer (B) utilised in the resin according to the invention each have a molecular weight distribution characterised by a ratio $M_W/M_n$ greater than 4. The $M_W/M_n$ ratio means the ratio between the mean molecular mass by weight $M_W$ and the mean molecular mass by number $M_n$ of the polymer as they are measured by steric exclusion chromatography (SEC) according to the developing standards ISO/DIS 16014-1 and ISO/DIS 16014-2. The SEC is conducted in 1,2,4-trichlorobenzene at 135° C. and 1 ml/min on a Waters 150 C chromatograph equipped with a detector by refractometry. The injections are effected on a set of four WATERS® HT-6E columns in the following conditions: injection of 400 μl of a 0.5 g/l solution of polymer and of IRGANOX® 1010, linear calibration curve based on Mark-Houwink's coefficients for polystyrenes of K=1.21× 10$^{-4}$ and a=0.707 and for polyethylenes K=3.92×10$^{-4}$ and a=0.725.

Polymer (A) preferably has a molecular weight distribution $M_W/M_n$ that does not exceed 12, more particularly not 10. Copolymer (B) preferably has a molecular weight distribution $M_W/M_n$ of at least 6 but no more than 15, preferably no more than 12. It has been found that utilisation of polymers (A) and (B) having a molecular weight distribution $M_W/M_n$ greater than 4 makes it possible to obtain compositions having better homogeneity when the composition is utilised subsequently in comparison with compositions having the same composition and the same characteristics but comprising ethylene polymers having a molecular mass distribution $M_w/M_n$ below 4.

The resins of the invention are preferably obtained by means of a process utilising at least two polymerisation reactors connected in series, according to which process:

in a first reactor, ethylene is polymerised in suspension in a medium comprising a diluent, hydrogen, a catalyst based on a transition metal and a cocatalyst so as to form from 47 to 52% by weight with respect to the total weight of the composition of ethylene polymer (A), said medium comprising polymer (A) in addition is drawn off from said reactor and is subjected to expansion so as to degas at least part of the hydrogen, after which said at least partially degassed medium comprising polymer (A) and some ethylene and 1-hexene or 1-octene and optionally at least another alpha-olefin containing from 4 to 10 carbon atoms are introduced into a further reactor in which polymerisation in suspension is effected in order to form from 48 to 53% by weight with respect to the total weight of the composition of ethylene copolymer (B).

Polymerisation in suspension means polymerisation in a diluent which is in the liquid state in the polymerisation conditions (temperature, pressure) used, these polymerisation conditions or the diluent being such that at least 50% by weight (preferably at least 70%) of the polymer formed is insoluble in said diluent.

The diluent used in this polymerisation process is usually a hydrocarbon diluent, inert to the catalyst, to the cocatalyst and to the polymer formed, such for example as a linear or branched alkane or a cycloalkane, having from 3 to 8 carbon atoms, such as hexane or isobutane.

The quantity of hydrogen introduced into the first reactor is in general set so as to obtain, in the diluent, a molar ratio between hydrogen and ethylene of 0.05 to 1. In the first reactor, this molar ratio is preferably at least 0.1.

The medium drawn off from the first reactor comprising in addition the polymer (A) is subjected to expansion so as to eliminate (degas) at least part of the hydrogen. The expansion is advantageously effected at a temperature below or equal to the polymerisation temperature in the first reactor. The temperature at which the expansion is effected is usually greater than 20° C., it is preferably at least 40° C. The pressure at which the expansion is carried out is below the pressure in the first reactor. The expansion pressure is preferably below 1.5 MPa. The expansion pressure is usually at least 0.1 MPa. The quantity of hydrogen still present in the at least partially degassed medium is generally below 1% by weight of the quantity of hydrogen initially present in the medium drawn off from the first polymerisation reactor, this quantity is preferably below 0.5%. The quantity of hydrogen present in the partially degassed medium introduced into the further polymerisation reactor is therefore low or even nil. The further reactor is preferably also supplied with hydrogen. The quantity of hydrogen introduced into the further reactor is in general set so as to obtain, in the diluent, a molar ratio between hydrogen and ethylene of 0.001 to 0.1. In this further reactor, this molar ratio is preferably at least 0.004. It does not exceed preferably 0.05. In the process according to the invention, the ratio between the hydrogen concentration in the diluent in the first reactor and that in the further polymerisation reactor is usually at least 20, preferably at least 30. Particularly preferred is a ratio of concentrations of at least 40. This ratio does not usually exceed 300, preferably not 200.

The quantity of 1-hexene or 1-octene introduced into the further polymerisation reactor is such that in the further reactor the comonomer/ethylene molar ratio in the diluent is preferably at least 0.05, more preferably at least 0.1. The comonomer/ethylene molar ratio preferably does not exceed 3, more preferably not 2.8.

The catalyst employed in the polymerisation process may be any catalyst(s) suitable for preparing the low and high density fractions. Preferably, the same catalyst produces both the high and low molecular weight fractions. For example, the catalyst may be a chromium catalyst, a Ziegler-Natta catalyst, or a metallocene catalyst. Preferably the catalyst is a Ziegler-Natta catalyst.

In the case of a Ziegler-Natta catalyst, the catalyst used comprises at least one transition metal. Transition metal means a metal of groups 4, 5 or 6 of the Periodic Table of elements (CRC Handbook of Chemistry and Physics, 75th edition, 1994-95). The transition metal is preferably titanium and/or zirconium. A catalyst comprising not only the transition metal but also magnesium is preferably utilised. Good results have been obtained with catalysts comprising:

from 10 to 30%, preferably from 15 to 20%, more preferably 16 to 18% by weight of transition metal, from 0.5 to 20%, preferably from 1 to 10%, more preferably 4 to 5% by weight of magnesium, from 20 to 60%, preferably from 30 to 50%, more preferably 40 to 45% by weight of halogen, such as chlorine, from 0.1 to 10%, preferably from 0.5 to 5%, more preferably 2 to 3% by weight of aluminium;

the balance generally consisting of elements arising from products used for their manufacture, such as carbon, hydrogen and oxygen. These catalysts are preferably obtained by coprecipitation of at least one transition metal composition and a magnesium composition by means of a halogenated organoaluminium composition. Such catalysts are known, they have notably been described in U.S. Pat. Nos. 3,901,863, 4,294,200 and 4,617,360. The catalyst is preferably introduced only into the first polymerisation reactor, i.e. there is no introduction of fresh catalyst into the further polymerisation reactor.

The cocatalyst utilised in the process is preferably an organoaluminium compound. Unhalogenated organoaluminium compounds of formula $AlR_3$ in which R represents an alkyl grouping having from 1 to 8 carbon atoms are preferred. Particularly preferred are triethylaluminium and triisobutylaluminium. The cocatalyst is introduced into the first polymerisation reactor. Fresh cocatalyst may also be introduced into the further reactor. The quantity of cocatalyst introduced into the first reactor is in general at least $0.1 \times 10^{-3}$ mole per liter of diluent. It does not usually exceed $5 \times 10^{-3}$ mole per liter of diluent. Any quantity of fresh cocatalyst introduced into the further reactor does not usually exceed $5 \times 10^{-3}$ mole per liter of diluent.

In the preferred process of the invention using a Ziegler-Natta catalyst, the polymerisation temperature is generally from 20 to 130° C. It is preferably at least 60° C. For preference, it does not exceed 115° C. The total pressure at which the process is effected is in general from 0.1 MPa to 10 MPa. In the first polymerisation reactor, the total pressure is preferably at least 2.5 MPa. Preferably, it does not exceed 5 MPa. In the further polymerisation reactor, the total pressure is preferably at least 1.3 MPa. Preferably, it does not exceed 4.3 MPa.

The period of polymerisation in the first reactor and in the further reactor is in general at least 20 minutes, preferably at least 30 minutes. It does not usually exceed 5 hours, preferably not 3 hours.

In this process, a suspension comprising the resin of the invention is collected at the outlet of the further polymerisation reactor. The composition may be separated from the suspension by any known means. Usually, the suspension is subjected to a pressure expansion (final expansion) so as to eliminate the diluent, the ethylene, the alpha-olefin and any hydrogen from the composition.

This process makes it possible to obtain, with a good yield and with a low oligomers content, a composition having a very good compromise between mechanical properties and utilisation properties.

The compositions of the invention are well suited to the manufacture of pipes and pipe fittings, particularly pipes for the conveying of fluids under pressure such as water and gas. The invention therefore also concerns the use of a composition according to the invention for the manufacture of pipes or pipe fittings. Naturally, when they are used for the molten forming of articles, and more particularly for the manufacture of pipes or pipe fittings, the compositions of the invention may be mixed with the usual additives for utilisation of polyolefins, such as stabilisers (antioxidant agents, anti-acids and/or anti-UVs), antistatic agents and utilisation agents ("processing aid"), and pigments. The invention therefore concerns also a mixture comprising a composition according to the invention and at least one of the additives described above. Particularly preferred are mixtures comprising at least 95%, preferably at least 97%, by weight of a composition according to the invention and at least one of the additives described above. The manufacture of pipes by extrusion of a composition according to the invention is preferably carried out on an extrusion line comprising an extruder, a sizer and a drawing device. Extrusion is generally performed on an extruder of the single-screw type and at a temperature of 150 to 230° C. The sizing of the pipes may be effected by the creation of negative pressure outside the pipe and/or by the creation of positive pressure inside the pipe.

Pipes manufactured by means of the compositions according to the invention are characterised by:

good resistance to slow propagation of cracks (FNCT), reflected by a rupture time, as measured by the method described in the standard undergoing preparation ISO/DIS 16770.2 (2001) (at 80° C., under a stress of 5.0 MPa (in an Arkopal N100 2% solution)), greater than 100 hours;

good resistance to rapid propagation of cracks (RCP), reflected by a halting of crack propagation at an internal pressure generally equal to at least 10 bar, as measured at 0° C. on a pipe of diameter 110 mm and thickness 10 mm according to method S4 described in ISO standard F/DIS 13477(1996);

good long-term pressure resistance which may enable them to be attributed a higher MRS rating than the MRS 10 rating according to standard ISO/TR 9080.

The following examples are intended to illustrate the invention.

EXAMPLES 1-6 a) Preparation of the Catalyst

Magnesium diethylate was caused to react for 4 hours at 150° C. with titanium tetrabutylate in quantities such that the molar ratio of titanium to magnesium was equal to 2. Polymerisation grade hexane was added to the alcoholate mixture in order to obtain a solution containing 250 g of mixture per liter of solution. Thereafter the reaction product thus obtained was chlorinated and precipitated by placing it in contact with an ethylaluminium dichloride solution for 90 minutes at 45° C. The catalyst thus obtained, gathered from the suspension, comprised (% by weight):

Ti: 17; Cl: 41; Al: 2; Mg: 5.

b) Polymerisation

An ethylene polymer composition in suspension in isobutane was manufactured in two loop reactors connected in series, separated by a device making it possible to effect pressure expansion continuously.

The catalyst as described in item a) of Example 1 was introduced continuously into the first loop reactor, and polymerisation of the ethylene to form polymer (A) was effected in this medium. Said medium comprising polymer (A) in addition was drawn off continuously from said reactor and was subjected to expansion (48° C., 0.6 MPa) so as to eliminate at least part of the hydrogen. The resulting medium at least partially degassed from hydrogen was then introduced continuously into a second polymerisation reactor at the same time as ethylene, hexene, isobutane and hydrogen, and polymerisation of the ethylene and the hexene was effected in order to form the copolymer (B). The suspension comprising the polymer composition was drawn off continuously from the second reactor and this suspension was subjected to a final expansion so as to evaporate the isobutane and the reagents present (ethylene, hexene and hydrogen) and recover the composition in the form of a powder that was subjected to drying in order to finish the degassing of the isobutane.

The other polymerisation conditions are specified in Table 1.

Compounding

To the resins of Examples 1 to 6 were added, per 100 parts of polyethylene composition, 0.35 parts by weight of antioxidant IRGANOX® B225, 0.075 parts by weight of zirconium stearate, 0.025 parts of weight of calcium stearate and 2.25 parts by weight of carbon black.

The resultant composition was extruded on a compounding device comprising a melting zone (single screw extruder, 90 mm screw diameter, 24D length) and a homogenising zone (single screw extruder, 90 mm diameter screw, 36D length) at a rate of 40 kg/hr and with a residence time of 540 seconds. At the end of the compounding device, the resulting compound was passed through a strand pelletiser and pellets of the resulting compound were recovered.

TABLE 1

| | EXAMPLE | | | | | |
|---|---|---|---|---|---|---|
| | 1 | 2 | 3 | 4 | 5 | 6 |
| REACTOR 1 | | | | | | |
| $C_2$ (g/kg diluent) | 18.8 | 19.8 | 21.1 | 20.3 | 20.3 | 20.5 |
| $H_2/C_2$ mole ratio | 63.8 | 43.8 | 43.1 | 47.4 | 48.4 | 46.2 |
| T (° C.) | 85 | 85 | 85 | 85 | 85 | 85 |
| dwell time (h) | 1.33 | 1.3 | 1.32 | 1.32 | 1.32 | 1.32 |
| REACTOR 2 | | | | | | |
| $C_2$ (g/kg diluent) | 14.9 | 13.8 | 12.0 | 14.9 | 15.1 | 14.3 |
| $H_2/C_2$ mole ratio | 0.73 | 0.51 | 0.47 | 0.71 | 0.69 | 0.56 |
| $C_6/C_2$ mole ratio | 187.7 | 177.6 | 183.2 | 143.7 | 128.1 | 147.0 |
| T (° C.) | 75 | 75 | 75 | 75 | 75 | 75 |
| dwell time (h) | 1.29 | 1.28 | 1.3 | 1.32 | 1.28 | 1.29 |

TABLE 2

| | EXAMPLE | | | | | |
|---|---|---|---|---|---|---|
| | 1 | 2 | 3 | 4 | 5 | 6 |
| Reactor 1 | | | | | | |
| p1 (wt %) | 48.9 | 53.1 | 52.7 | 49.0 | 49.0 | 49.0 |
| $MI_2$ (g/10 min)# | 27.4 | 7.5 | 10.8 | 8.9 | 8.3 | 9.3 |
| Density (kg/m³) | 973.7 | 972 | 974.8 | 971.5 | 971.2 | 971 |
| Final granulated product | | | | | | |
| $MI_5$ (g/10 min) | 0.57 | 0.58 | 0.45 | 0.68 | 0.57 | 0.44 |
| $MI_{21}$ (g/10 min) | 13.1 | 11.7 | 11.8 | 12.8 | 10.3 | 9.9 |
| $\mu_2$ (1000 Pa · s) | 20 | 20.8 | 21.2 | 21 | 21.9 | 22.7 |
| Mw/Mn | 18.89 | 15.98 | 18.37 | 17.84 | 15.56 | 19.61 |
| Density (kg/m³)* | 958.9 | 959.9 | 958.2 | 959.9 | 960.2 | 958.1 |

$MI_2$ measured with 8 mm length/1.0 mm internal diameter die, which gives values approximately 19 times lower than an 8 mm/2.095 mm die
*including pigment Mechanical Property Tests Creep Resistance Creep resistance was evaluated on 50 mm SDR 17 pipes produced on KM and/or Battenfeld extruders according to ISO 1167. The pressure tests results are on the basis of an MRS rating equal 10 MPa, according to the standard ISO9080.

Stress Crack Resistance

Stress crack resistance was evaluated on notch pipe tests, diameter 110 mm, SDR 11, according to ISO13479.

Rapid Crack Propagation

Rapid crack propagation was determined at an internal pressure generally equal to at least 10 bars, as measured at 0° C. on a pipe of diameter 110 mm and thickness 10 mm according to method S4 described in ISO13477.

TABLE 3

| | EXAMPLE | | | | | |
|---|---|---|---|---|---|---|
| | 1 | 2 | 3 | 4 | 5 | 6 |
| Creep | | | | | | |
| Pipe 1 - 12.4 MPa | 142 | 190 | 138 | 142 | 337 | 209 |
| Pipe 2 - 12.4 MPa | 152 | 200 | 121 | 184 | 418 | 198 |
| Pipe 1 - 12.1 MPa | 937 | 731 | 538 | 879 | 1149 | 465 |
| Pipe 2 - 12.1 MPa | 1018 | 815 | 583 | 989 | 1160 | 459 |
| Pipe 1 - 5.5 MPa | 167 | 230 | 208 | 897 | 3898 | 449 |
| Pipe 2 - 5.5 MPa | 140 | 277 | 277 | 1070 | 4129 | 555 |
| Pipe 1 - 5.0 MPa | 6521 | 4820 | — | 4663 | 4201 | >5820 |
| Stress crack resistance - notched pipe test | | | | | | |
| Pipe 1 - 4.6 MPa | 3498 | 2402 | 7956 | 1537 | 1563 | 4100 |
| Pipe 2 - 4.6 MPa | 3470 | 2526 | 8712 | 1414 | 1602 | 4663 |
| Rapid crack propagation | | | | | | |
| 0° C. | >10 | >10 | | >10 | >10 | >10 |
| −5° C. | >8 | >10 | | >10 | >10 | >10 |
| −10° C. | >10 | >10 | | 4 | >10 | >10 |
| −15° C. | 3.50 | 3.50 | | | | 3.50 | >5 |

It can be seen from the above table that all the resins pass the European requirements (EN1555-EN12201-ISO4427-ISO4437) for creep resistance of a PE100 resin:

At least 100 hours at 12.4 MPa, 20° C.
At least 165 hours at 5.5 MPa, 80° C. without brittle failure
At least 1000 hours at 5 MPa, 80° C.

For stress crack resistance, all of the resins comfortably pass the European requirements (EN1555-EN12201-ISO4427-ISO4437) for a PE100 resin, which is a resistance time at least equal to 165 hours at 80° C., 5.5 MPa.

All the resins show good resistance to rapid crack propagation (RCP).

The invention claimed is:

1. Polyethylene resin having an $MI_5$ of from 0.40 to 0.70 g/10 min, and comprising from 47 to 52 wt % of a low molecular weight polyethylene fraction, and from 48 to 53 wt % of a high molecular weight polyethylene fraction, wherein the high molecular weight polyethylene fraction comprises a copolymer of ethylene and either 1-hexene or 1-octene and wherein the resin has a density after granulation and addition of additives of between 957 kg/m³ and 963 kg/m³.

2. Resin according to claim 1, wherein the low molecular weight polyethylene fraction comprises a polyethylene having a density of at least 0.965 g/cm³ and an $MI_2$ of from 5 to 1000 g/10 min, and the high molecular weight polyethylene fraction has a density of from 0.910 to 0.940 g/cm³ and an $MI_5$ of from 0.01 to 2 g/10 min.

3. Resin according to claim 1, wherein it comprises 48-51% by weight with respect to the total weight of the composition of the ethylene polymer fraction (A).

4. Resin according to claim 2, wherein it comprises 49-51% by weight with respect to the total weight of the composition of the ethylene polymer fraction (A).

5. Resin according to claim 2, wherein it has an $MI_5$ of from 0.45 to 0.65 g/10 min.

6. Resin according to claim 2, wherein it has a density after granulation and addition of additives between 959 kg/m³ and 961 kg/m³, or a natural density of between 950 and 952 kg/m³.

7. Resin according to claim 2, wherein the composition comprises at least 0.2% mole % and at most 0.7 mole % of monomer units derived from 1-hexene or 1-octene.

8. Polyethylene resin having an $MI_5$ of from 0.40 to 0.70 g/10 min, a density after granulation and addition of additives between 957 kg/m³ and 963 kg/m³, and a stress crack resistance time of at least 165 hours at 80° C. and 5.5 MPa according to standards EN1555-EN12201-ISO4427-ISO4437.

9. Resin according to claim 8, comprising from 47 to 52 wt % of a low molecular weight polyethylene fraction, and from 48 to 53 wt % of a high molecular weight polyethylene fraction, wherein the low molecular weight polyethylene fraction comprises a polyethylene having a density of at least 0.965 g/cm³ and an $MI_2$ of from 5 to 1000 g/10 min, and the high molecular weight polyethylene fraction has a density of from 0.910 to 0.940 g/cm³ and an $MI_5$ of from 0.01 to 2 g/10 min.

10. Resin according to claim 8, wherein it has an $MI_5$ of from 0.45 to 0.65 g/10 min.

11. Resin according to claim 8, wherein it has a density after granulation and addition of additives between 959 kg/m³ and 961 kg/m³, or a natural density of between 950 and 952 kg/m³.

12. Resin according to claim 8, wherein the composition comprises at least 0.2% mole % and at most 0.7 mole % of monomer units derived from 1-hexene or 1-octene.

13. Pipe or pipe fitting comprising a resin as defined in claim 1.

14. Resin according to claim 5, wherein it has an $MI_5$ of from 0.50 to 0.60 g/10 min.

15. Resin according to claim 10, wherein it has an $MI_5$ of from 0.50 to 0.60 g/10 min.

* * * * *